United States Patent [19]

Speed

[11] Patent Number: 5,263,274
[45] Date of Patent: Nov. 23, 1993

[54] GAME LURING SCENT DIFFUSING DEVICE

[76] Inventor: Kenneth D. Speed, Rte. 4, Box 229-B, Collins, Miss. 39428

[21] Appl. No.: 997,710

[22] Filed: Jan. 4, 1993

[51] Int. Cl.⁵ ............................................ A01M 31/06
[52] U.S. Cl. ........................................ 43/1; 222/187; 222/108; 239/43
[58] Field of Search ................. 43/1, 2; 222/187, 108, 222/109, 130, 181, 173, 175; 368/93; 239/43, 37, 35, 55, 57, 60

[56] References Cited

U.S. PATENT DOCUMENTS

| | | | |
|---|---|---|---|
| 4,226,829 | 10/1980 | Mike | 43/129 |
| 4,667,430 | 5/1987 | Ziese, Jr. | 43/1 |
| 4,773,177 | 9/1988 | Gray, II et al. | 43/1 |
| 4,953,763 | 9/1990 | Kierum et al. | 222/644 |
| 5,048,218 | 9/1991 | Stewart | 43/1 |
| 5,060,411 | 10/1991 | Uhlman | 43/1 |

Primary Examiner—Mark Rosenbaum
Assistant Examiner—Chuck Y. Mah
Attorney, Agent, or Firm—Roylance, Abrams, Berdo & Goodman

[57] ABSTRACT

A game luring scent diffusing device includes a supply container and a collection container suspended from the supply container by an elongated porous wick extending between the containers. A first end of the wick extends through an opening in a cap that is threaded to the supply container. A second end of the wick extends through an opening in a cap that is threaded to the collection container. The supply container is suspended in an inverted manner so that the game luring scent flows downwardly along the wick where the scent becomes airborne by air currents. Excess amounts of the scent which flow down the wick continue to flow into the collection container where it is collected and stored for later use.

26 Claims, 2 Drawing Sheets

GAME LURING SCENT DIFFUSING DEVICE

FIELD OF THE INVENTION

The present invention is directed to a device for diffusing a game luring scent into air currents for attracting game. More particularly, the invention relates to a diffusing device including a receptacle for collecting the unused portion of the scent and reducing the waste of the scent material.

BACKGROUND OF THE INVENTION

Hunters often use a lure or scent for attracting game to a particular site. A predominant use of lures is for attracting deer. It is well known that deer are particularly susceptible to lures and attractants during the mating season. Several devices have been proposed in the past for dispensing the lure to a designated site. These devices are typically designed for slow release of the lure to the ground for prolonging the effectiveness of the lure.

One form of dispensing device for dispensing a scent comprises a container or reservoir and a dispensing spout. The dispensing spouts are designed to slowly drip the scent to the ground over an extended period of time. It is generally desirable to control the flow rate of the scent to prolong the life of the scent since the scent is expensive. Examples of this type of dispensing device are found in U.S. Pat. No. 4,667,430 to Ziese Jr., U.S. Pat. No. 4,773,177 to Gray II et al., U.S. Pat. No. 5,060,411 to Uhlman and U.S. Pat. No. 4,953,763 to Kierum et al. Although these devices are effective in dispensing the scent, they are inefficient since a large portion of the scent soaks into the ground and is lost. By dripping the scent onto the ground, only a small portion becomes airborne so as to attract the game. The remainder of the scent is absorbed by the ground or washed away by rain.

Other dispensing devices for dispensing a scent include a porous body that is saturated by the scent. The device can be carried by the hunter or suspended from a tree or bush to attract the game to the site. One example of this form of device is disclosed in U.S. Pat. No. 5,048,218 to Stewart. The device disclosed in this patent includes a container and a liquid absorbent wick. The wick includes a central core and a plurality of projecting legs extending beyond the central core to enhance airborne distribution of the game luring scent. The wick is stored in the container to absorb the scent. The wick is then removed from the container and hung in a tree or bush to diffuse the scent to the air currents. This device has the disadvantage of not having a container capable of providing a continuous supply of scent to the wick. Furthermore, when the wick is first removed from the container, the wick is saturated with the scent which tends to drip onto the ground from the ends of the wick legs, thereby reducing the efficiency of the device.

The above-noted devices are not entirely effective in dispensing game lures in an efficient manner. Accordingly, there is a continuing need for a device for diffusing a game luring scent while minimizing waste of the scent.

SUMMARY OF THE INVENTION

Accordingly, it is a primary object of the invention to provide a game luring scent dispensing device that is able to provide a continuous supply of the scent for extended periods of time.

A further object of the invention is to provide a game luring scent dispensing device for diffusing the scent to the air currents for attracting game in an easy and efficient manner.

A further object of the invention is to provide a game luring scent dispensing device including a receptacle to collect excess scent and prevent excess scent from falling to the ground.

Still another object of the invention is to provide a game luring scent diffusing type dispenser that is inexpensive and simple to manufacture and operate.

A further object of the invention is to provide a game luring scent diffusing type dispensing device that is simple to use and is effective in diffusing the scent and attracting game by airborne currents while reducing waste of the scent material.

These and other objects of the invention are basically attained by providing a game luring device comprising in combination a liquid game luring scent supply means having a dispensing outlet at a lower end thereof; an elongated porous wick having a first end suspended from said dispensing outlet for receiving said liquid scent; and a receiving container suspended from a second end of said wick for receiving liquid scent from said wick, said receiving container being suspended below said supply means and said wick.

The above objects of the invention are further attained by providing a game lure diffusing device comprising a supply container having an open neck; a first cap removably coupled to the neck of the first cap, the first cap having a dispensing outlet therein for dispensing contents from the supply container; an elongated porous wick having a first end extending from said supply container through said dispensing outlet for receiving contents from the container and diffusing the contents to the air, said wick substantially closing the dispensing outlet; a receiving container having an open neck; a second cap removably coupled to said neck of said receiving container, said second cap having an inlet opening, said wick having a second end extending axially through said inlet opening into said receiving container.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form a part of this original disclosure.

DETAILED DESCRIPTION OF THE INVENTION

Figure 1:
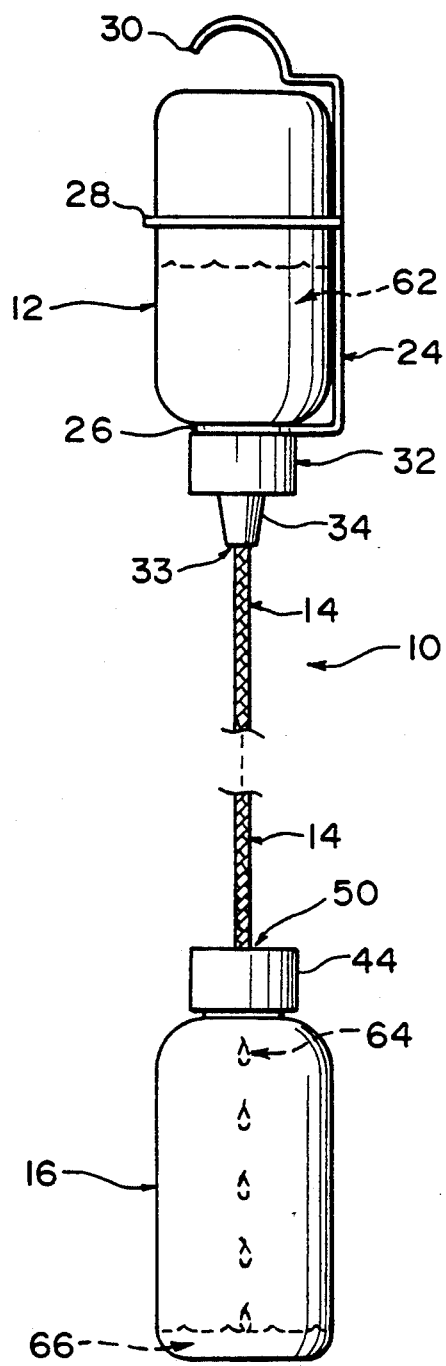
FIG. 1 is an elevated side plan view of the diffusing device in accordance with a preferred embodiment showing the device suspended by the supply container with the wick and collection container suspended below.
Figure 2:
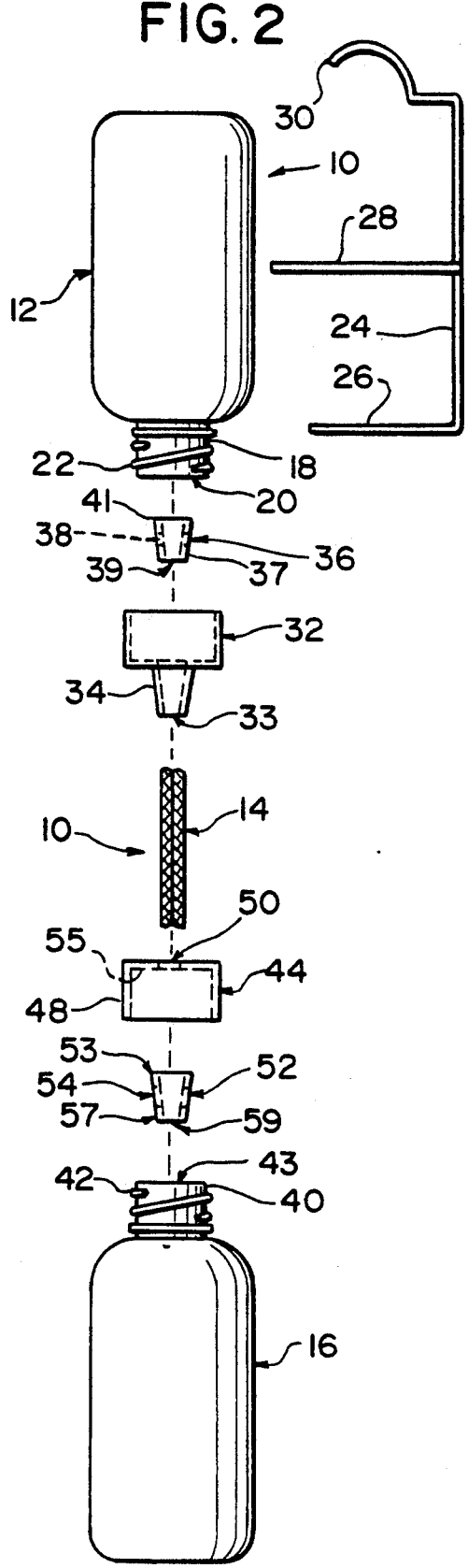
FIG. 2 is an elevated exploded perspective view of the diffusing device of FIG. 1 showing the components of the diffusing device.
Figure 3:
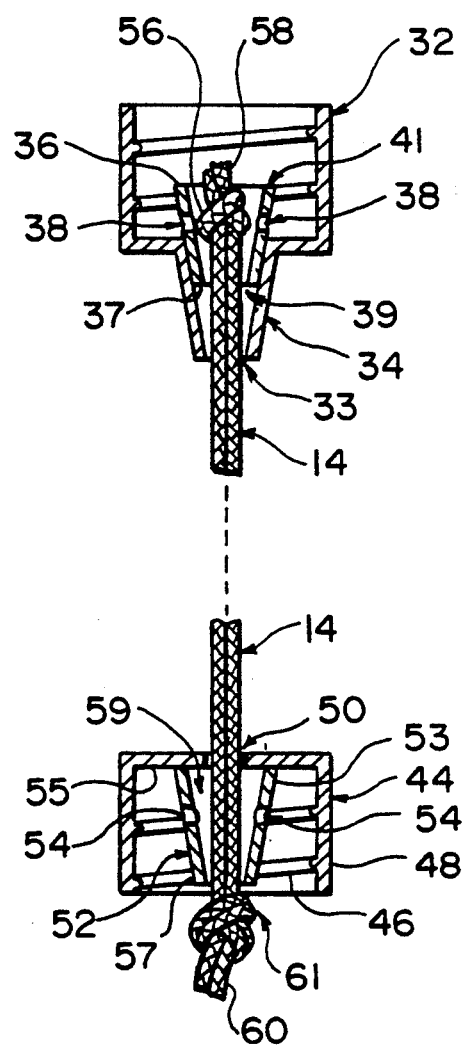
FIG. 3 is an elevated partial cross-sectional view of the cap arrangement and wick in accordance with a preferred embodiment of the invention.

Referring to FIGS. 1-3, the game luring scent diffusing device 10 of the invention comprises a supply container 12, a porous wick 14 and collection container 16. The porous wick 14 connects the supply container 12 to the collection container 16.

As shown in FIG. 2, the supply container 12 in preferred embodiments of the invention is a bottle having a neck 18 defining an outlet 20. The neck 18 includes external threads 22 for receiving a standard threaded closure cap (not shown). The shape of the supply container 12 is not critical for the operation of the diffusing device. However, for convenience, a standard bottle shape is desired. In preferred embodiments, the supply container 12 is made from a non-breakable, light-weight plastic material such as polyethylene.

A hanger 24 is attached to the supply container 12 as shown in FIG. 1. In the illustrated embodiment, the hanger 24 is formed from wire having lower loop 26 gripping the neck 18 of the supply container 12 and an upper loop 28 extending around the middle portion of the supply container 12. A hook 30 extends upwardly from the hanger 24 as shown in FIG. 1. The hook 30 is dimensioned to vertically hang the supply container 12 in an inverted position from a branch, bush or other support structure. The hanger 24 may be removably attached or permanently attached to the supply container 12.

A threaded dispensing cap 32 is removably coupled to the neck 18 of the supply container 12. A frustoconical dispensing nozzle 34 extends axially outward from the dispensing cap 32 to define a dispensing outlet 33. As shown in FIG. 3, a frustoconical shaped venting member 36 forming a sleeve fits in the frustoconical nozzle 34 so that only a lower section of the venting member 36 is seated in the nozzle 34. The venting member 36 has a tapered end 37 defining an axial outlet passage 39. A pair of laterally disposed vent openings 38 are formed in opposite side walls of the vent member 36. The openings 38 are preferably positioned a distance from the tapered end 37 of the vent member 36 so as to be above the dispensing nozzle 34, as shown in FIG. 3. The frustoconical venting member 36 cooperates with the cap 32 and nozzle 34 so that the tapered end 37 forms a substantially fluid tight friction or interference fit with the inner surface of the nozzle 34. The outwardly flared end 41 is directed inwardly toward the supply container 12.

The wick 14 is an elongated porous body which extends from the supply container 12 to the collection container 16. The wick 14 may be a single strand as shown in FIG. 1 or a double strand as shown in FIGS. 2 and 3. In preferred embodiments, the wick 14 is made from a double strand of twisted twine or rope. The wick 14 can be made of a synthetic or natural fiber which provides sufficient absorption of the scent and provides sufficient surface area to diffuse the scent to the air currents. The length of the wick 14 is typically about 8 inches, although the length may be longer or shorter as desired. The length of the wick can be dictated by the volatility of the scent and the desired rate of diffusion of the scent. In one embodiment, the wick substantially fills the opening 33 to control the flow of the scent from the supply container.

The collection container 16 in preferred embodiment is the same shape and size as the supply container 12. The collection container 16 as shown in FIG. 2 includes a neck 40 to define an inlet opening 43. External threads 42 are provided on the neck 40 for coupling with a standard closure cap (not shown).

A collection cap 44 having internal threads 46 in the side wall 48 is threadedly coupled to the collection container 16 as shown in FIGS. 1 and 3. Referring to FIG. 3, the cap 44 also includes a central opening 50. The opening 50 is dimensioned to accommodate the wick 14 and allow excess scent to flow into the collection container.

An inverted frustoconical vent member 52 is positioned inside the cap 44. As shown in FIG. 3, the flared base 53 of the vent member 52 is positioned adjacent the inner surface 55 of the cap 44 with the tapered end 57 extending away from the cap 44. The tapered end 57 defines an axial passage 59. Two laterally disposed vent openings 54 extend radially through the side wall of the vent member 52. The vent member 52 may be fixed to the cap 44, although in preferred embodiments, the vent member is a separate element.

ASSEMBLY AND OPERATION

In the assembly and operation of the scent diffusing device 10, a liquid game luring scent 62 such as deer urine is poured into the supply container 12. The scent may be natural or synthetic material that is suitable for attracting the desired game. A first end 58 of the wick 14 is passed through the opening 33 in the nozzle 34 and through the opening 39 in the tapered end 37 of the vent member 36, as shown in FIG. 3. The first end 58 of the wick is secured by a suitable retaining means such as by tying a knot 56 in the end of the wick so as to prevent the wick from being pulled through the opening 39 in the vent member 36 and the opening 33 in the nozzle 34. As tension is applied to the wick 19, the knot 56 seats inside the tapered end 37 of the vent member 36 and the vent member 36 seats in the frustoconical nozzle 34.

A second end 60 of the wick 14 is passed through the opening 50 of cap 44 to the inside of the cap 44. The wick 14 is then passed through the axial passage 59 in the vent member 52 so that the tapered end 57 of the vent 52 is directed away from the cap 44. The wick 14 is secured to the vent member 52 by a suitable retainer such as by tying a knot 61 as shown in FIG. 3. As tension is applied to the wick 14, the knot 61 engages the tapered end 57 of the vent member 52 so that the flared base 53 seats against the cap 44.

The dispensing cap 32 is attached to the supply container 12 by screwing the cap 32 onto the neck 18. The collecting cap 44 is screwed onto the neck 40 of the collection container 16. The supply container 12 is then vertically suspended by the hook 30 from a suitable support (not shown) so that the wick 14 is suspended below the supply container 12 and the collection container 16 is suspended at the lower end of the wick 14.

As shown in FIG. 1, the liquid scent 62 is contained in the supply container 12 and flows downwardly through the wick by gravity along the length of the wick 14. The scent 62 exiting the supply container is replaced by air which passes through the nozzle 34 around the wick 14 and is vented through the openings 38 in the vent member 36. As the scent travels down the wick 14, the scent is diffused to the surrounding air and dispersed by air currents to the surrounding area. The scent that is not dispersed by the air currents continues down the wick and through the opening 50 in the cap 44 and the vent member 52 where the excess scent falls from the end of the wick as droplets 64 where it is collected in the collection container 16. The unused portion of the scent 66 collected in the collection container 16 can then be transferred to the supply container and used again. The diffusing device of this invention thus has the capability of collection the unused portion of the scent in the collection container 16 which would otherwise fall to the ground and be lost.

The opening 50 in the cap 44 is dimensioned to retain the vent member 52 within the cap 44 while permitting the excess scent to flow through the opening. As the collection container 16 is filled by the scent, the air in the container 16 is displaced and exits the container by flowing through the opening 50 in the cap. The scent flowing along the wick 14 will usually drip from the end of the wick into the container, although a portion of the scent may collect in the tapered end of the vent member 52 and flow through the openings 54.

The rate of diffusion of the scent can be controlled by the size of the opening in the dispensing nozzle 34 which will determine the flow rate of the scent from the supply container 12 to the wick 14. The length of wick exposed to the air currents will also have an effect on the amount of the scent dispersed. In practice, the wick having a length of about 8 inches has been found to be satisfactory for many purposes. The wick can be longer or shorter as desired. When it is desirable to shorten the wick, the knot on either or both ends of the wick can be moved toward the center of the wick. The ends of the wick can be simply stored in the supply or collection containers. In this manner, the length of the wick can be shortened or lengthened as needed.

In the illustrated embodiment, the hanger 24 is coupled to the supply container 12. In alternative embodiments, the collection container 16 may have a similar hanger or the hanger 24 can be removed and attached to the collection container 16. In this manner, the position of the supply container 12 and the collection container 16 can be reversed without the need for transferring the collected scent 66 back to the supply container 12.

While a single embodiment of the invention is illustrated, it will be readily understood by those skilled in the art that various changes and modifications can be made therein without departing from the scope of the invention defined in the appended claims.

What is claimed is:

1. A game luring device comprising in combination:
   supply means for containing a liquid game luring scent;
   a porous wick having a first and a second end, said first end being connected to said supply means for receiving said scent; and
   a container coupled to said second end of said wick for receiving said liquid scent from said wick, said container being suspended by said wick.

2. The device according to claim 1, wherein said supply means is a container having a dispensing opening.

3. The device according to claim 2, and further comprising
   a cap coupled to said dispensing opening, said cap having dispensing means for dispensing said scent; and
   said wick being disposed in said dispensing means.

4. The device according to claim 3, wherein said dispensing means is a nozzle extending from said cap.

5. The device according to claim 3, and further comprising
   vent means cooperating with said nozzle for venting air to said supply means.

6. The device according to claim 5, wherein said vent means is a frustoconical shaped sleeve, and wherein said wick extends through said sleeve.

7. The device according to claim 1, wherein said wick is an elongated porous body.

8. The device according to claim 1, wherein said wick comprises two substantially parallel, elongated porous bodies.

9. The device according to claim 1, and further comprising
   hanger means for suspending said supply means so that said scent is dispensed to said wick.

10. The device according to claim 1, wherein said container includes a cap coupled thereto, said cap having an opening receiving said wick.

11. The device according to claim 10, and further comprising
    vent means cooperating with said cap for venting said container.

12. The device according to claim 11, wherein said vent means is a frustoconical sleeve having at least one vent opening in a side wall thereof, and wherein said wick extends axially through said sleeve.

13. The device according to claim 1, and further comprising
    first connecting means for connecting said first end of said wick to said supply means, and
    second connecting means for connecting said second end of said wick to said container.

14. The device according to claim 13 wherein
    said first connecting means comprises a first knot in said first end of said wick, and
    said second connecting means comprises a second knot in said second end of said wick.

15. A game luring device comprising in combination:
    a liquid game luring scent supply means having a dispensing outlet at a lower end thereof;
    an elongated porous wick having first and second ends, said wick being suspended from said dispensing outlet by said first end of said wick for receiving said scent; and
    a container connected to said second end of said wick for receiving liquid scent from said wick, said container being disposed below said supply means and said wick.

16. The device according to claim 15, and further comprising
    hanger means for hanging said supply means in an inverted position so that said scent flows through said dispensing outlet.

17. The device according to claim 15, and further comprising
    a cap removably coupled to said supply means, said cap including a frustoconical dispensing nozzle defining said dispensing outlet.

18. The device according to claim 15, and further comprising
    a first frustoconical sleeve having at least one vent opening in a side wall thereof, said sleeve cooperating with said dispensing nozzle for venting said supply means, and wherein said wick extends axially through said sleeve.

19. The device according to claim 15, wherein said wick comprises a plurality of substantially parallel porous bodies.

20. The device according to claim 15, wherein said container further comprises
a second cap removably coupled to said container, said second cap having an opening therein receiving said second end of said wick.

21. The device according to claim 15, wherein said second cap further comprises
a second frustoconical sleeve having at least one vent opening in a side wall thereof, said second end of said wick extending axially through said sleeve, and said sleeve cooperating with said cap for venting said container.

22. The device according to claim 15, wherein
said first end of said wick includes a first knot for retaining said wick in said dispensing outlet, and
said second end of said wick includes a second knot for connecting said wick to said container.

23. A diffusing device comprising:
a supply container having an open neck;
first cap means removably coupled to said neck of said supply container, said cap means having a dispensing outlet therein for dispensing contents from said supply container;
an elongated porous wick having a first end extending through said dispensing outlet into said supply container for receiving said contents and diffusing said contents, said wick substantially closing said dispensing outlet;
a receiving container having an open neck;
second cap means removably coupled to said neck of said receiving container, said second cap means having an inlet opening having a second end of said wick extending axially therethrough; and
hanger means for suspending said supply container in an inverted position so that the contents flows downwardly through the wick.

24. The device according to claim 23, wherein
said first end of said wick includes a first knot for connecting said wick to said supply container, and
said second end of said wick includes a second knot for connecting said wick to said receiving container.

25. The device according to claim 23, wherein said first cap means further comprises
a first frustoconical sleeve having at least one vent opening in a side wall thereof, said first end of said wick extending axially through said sleeve, and said sleeve cooperating with said cap for venting said supply container.

26. The device according to claim 23, wherein said second cap means comprises
a second frustoconical sleeve having at least one vent opening in a side wall thereof, said sleeve cooperating with said second cap means for venting said receiving container, and wherein said wick extends axially through said sleeve.

* * * * *